UNITED STATES PATENT OFFICE.

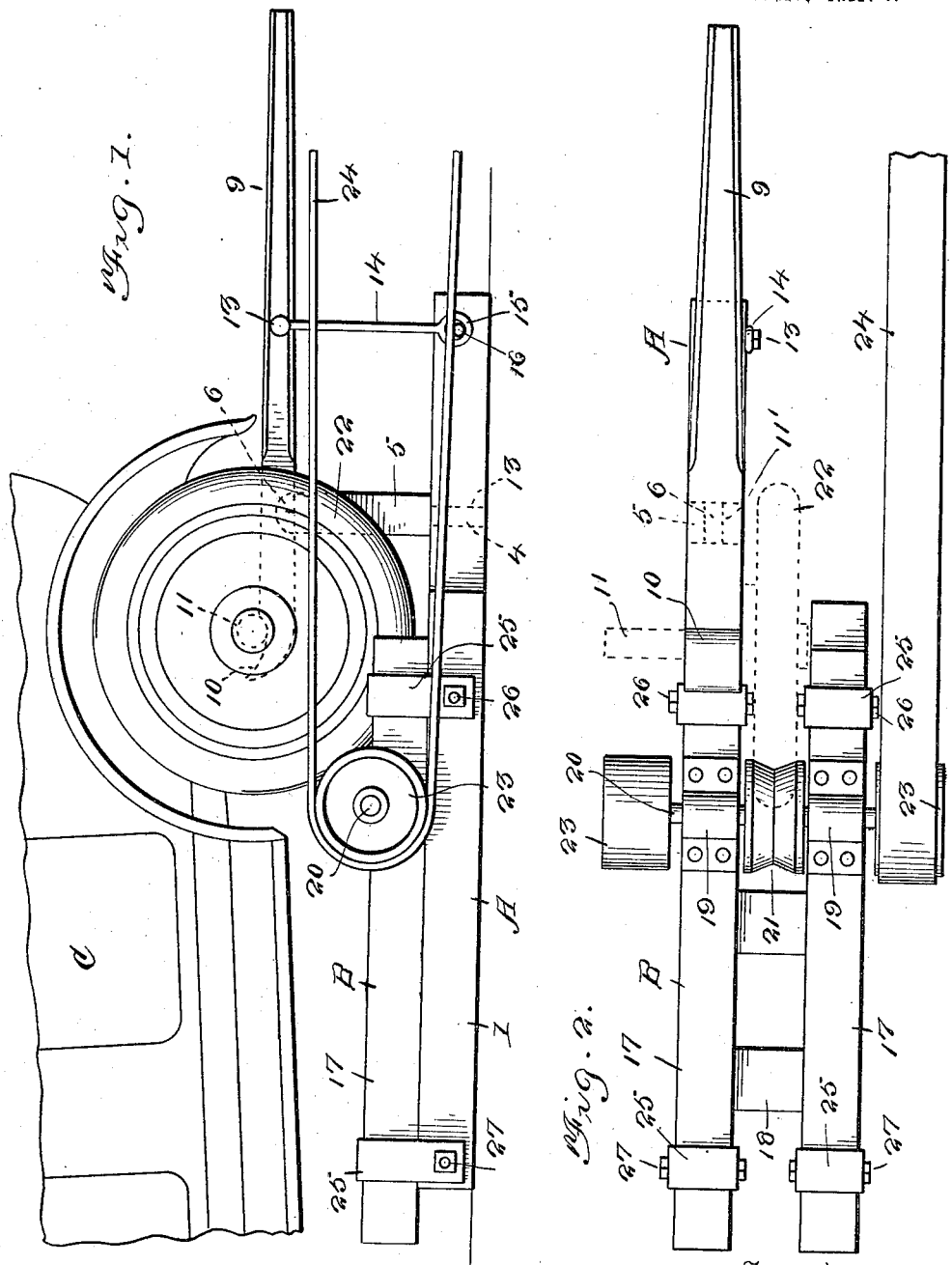

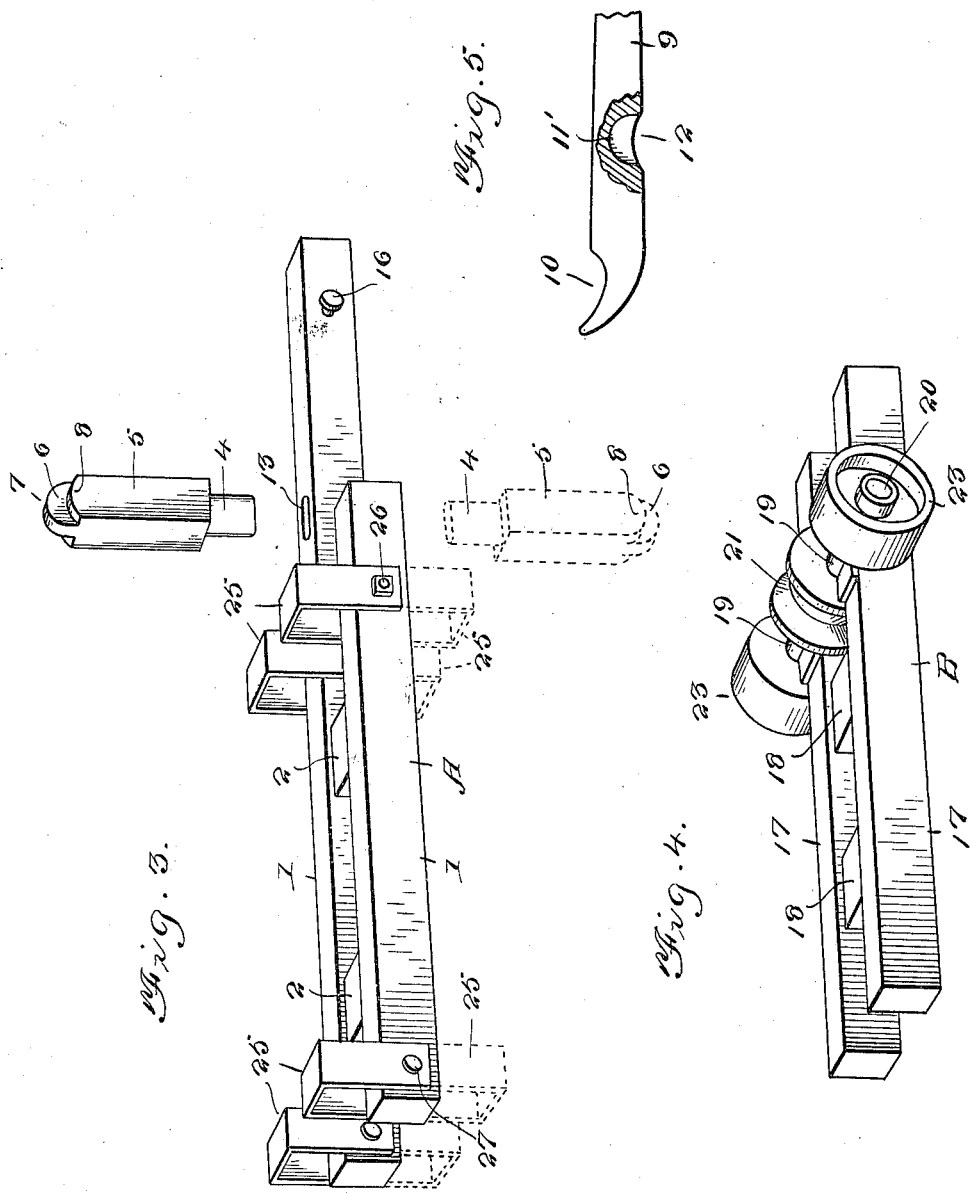

JOHN E. WISTNER, OF CREWE, VIRGINIA.

POWER-TRANSMISSION DEVICE FOR MOTOR-VEHICLES.

1,310,268.  Specification of Letters Patent.  Patented July 15, 1919.

Application filed April 27, 1918. Serial No. 231,189.

*To all whom it may concern:*

Be it known that I, JOHN E. WISTNER, a citizen of the United States, residing at Crewe, in the county of Nottoway and State of Virginia, have invented new and useful Improvements in Power-Transmission Devices for Motor-Vehicles, of which the following is a specification.

This invention relates to power transmission devices for motor vehicles, the object in view being to produce a simple and efficient device or machine whereby the power of the engine of a motor vehicle, delivered to the driving wheels thereof, may be transmitted by means of the improved device to any farm machine or other machinery desired to be driven, thus enabling the power of the motor vehicle to be utilized for various purposes.

One of the chief objects of the present invention is to produce a power transmitting device which is automatically self-adjusting or regulating, in that the rotary member or wheel, which receives the power directly from one of the driving wheels of the motor vehicle, is capable of adjusting itself in relation to the tire of the vehicle wheel, being under the influence of the driving belt, the latter serving to sustain the friction driven wheel of the transmission gearing in frictional driving contact with said vehicle wheel at all times.

A further object of the invention is to provide a power transmission device, the parts of which are reversible so that said device may be used in conjunction with and driven by either one of the driving wheels of the motor vehicle.

With the above and other objects in view, the invention consists in the construction, combination and arrangement of parts, as herein described, illustrated and claimed.

In the accompanying drawings:

Figure 1 is a side elevation of a portion of a motor vehicle, showing the power transmission device in its applied relation thereto.

Fig. 2 is a plan view of the power transmission device, showing the relation thereof to one of the driving wheels of a motor vehicle.

Fig. 3 is a perspective view of the base of the power transmission device illustrating by dotted lines the reverse positions of the guides and fulcrum post.

Fig. 4 is a perspective view of of the sliding self-adjusting frame of the power transmission device.

Fig. 5 is a fragmentary view of a detail of the invention.

Referring to the drawings, the power transmission device comprises as two of the essential elements thereof a supporting base designated generally at A and a sliding member or frame designated generally at B, the sliding member being mounted upon and slidable longitudinally of the base.

In the embodiment of the invention as illustrated in the accompanying drawings, the base A comprises a pair of bed rails 1 arranged in parallel and spaced relation to each other and rigidly connected together by means of cross bars or members 2. One of the bed rails or members 1 is of greater length than the other as shown and the longer one of said bed rails is formed with a non-circular opening 13 extending vertically therethrough and adapted to receive the correspondingly shaped shank 4 of a fulcrum post 5, the upper extremity of which is cut away to form a projecting lever holding and retaining lip 6 having a rounded bearing surface 7 and also other rounded bearing surfaces 8 arranged laterally of the lip 6.

In conjuntion with the fulcrum post 5, I employ a jack lever 9, having a depression 10 in the free end thereof adapted to receive and support the rear axle 11 of a motor vehicle designated generally at C and conventionally shown. The lever 9 is formed in the under side thereof with a socket 11 corresponding with the shape of the upstanding lip 6 of the fulcrum post and to receive the latter, and said lever is provided at opposite sides of the sockets 11 with concaved bearing faces 12 which rest upon and roll in contact with the rounded bearing surfaces 8 of said fulcrum post. The lever 9 has connected thereto by a pivot 13, a latch or link 14, the free end of which is formed with an eye 15 adapted to be placed into engagement with one of a pair of studs 16 projecting from opposite sides of the end of the longer bed rail 1 in the manner illustrated in the side elevation, said link serving to sustain the lever 9 in its vertical raising position, holding the adjacent driving wheel of the vehicle clear of the ground.

In conjunction with the base A, I employ the sliding frame or bearing member B above referred to. This sliding frame or bearing member, like the base, comprises longitudinal bars or rails 17 arranged in spaced parallel relation to each other and rigidly connected together by cross bars or members 18. Longitudinal bars 17 may be and are preferably of equal length and are provided upon the upper surface thereof with bearings 19 in which is journaled a rotary shaft 20 having fast on the central portion thereof a peripheral groove driving wheel or pulley 21 adapted to be frictionally driven by contact with the tire of the driving wheel 22 of the motor vehicle. The opposite end portions of the shaft 20 project laterally beyond the sliding frame and the bearings 19 thereof and fast upon said projecting ends of the shaft are belt pulleys 23 either one of which is adapted to receive a driving belt 24 which may be led to the driving pulley of any machine to which power is to be transmitted.

The sliding frame rests upon and is movable longitudinally of the base frame and is directed in its back and forth movements by upstanding U-shaped guides or guiding members 25. Certain of said guiding members 25 are secured in fixed relation to the respective bed rails 1 by means of detachable bolts 26 or the like, whereby said guiding members may be reversed or changed from the full line position of Fig. 3 to the dotted line position of the same figure, this being done in order to reverse the base frame and adapt the same to be used in conjunction with either of the rear driving wheels of the vehicle. The other guiding members 25 are connected by means of pivots 27 to the extreme end portions of the rails 1 so that they may be swung on their pivots from the full line position of Fig. 3 to the dotted line position of the same figure. When the guiding members 25 have been thus reversed or turned through an arc of one hundred and eighty degrees, the base frame may be turned upside down. This adapts the device as a whole to be applied to and used in conjunction with either of the driving wheels of the motor vehicle. When the guiding members 21 are reversed in the manner described, the fulcrum post 5 is also detached from the respective bed rail and reversed to its position as illustrated by full and dotted lines in Fig. 3.

From the foregoing description taken in connection with the accompanying drawings, it will now be seen that the base frame is reversible or capable of being turned with either side up, thereby adapting the device as a whole to be used in conjunction with either driving wheel of the motor vehicle. The device is placed partially under the motor vehicle in the manner illustrated in Fig. 1, with the longer bed rail 1 projecting in rear of the vehicle. The jack lever 9 is then brought into use so as to elevate the rear axle of the motor vehicle until the adjacent driving wheel of said vehicle is clear of the ground. The lever 9 is then locked and retained in such position by means of the link 14. The belt is now adjusted to one of the pulleys 23 and is adjusted as to its tension so as to hold the friction pulley 21 of the transmission device in driving contact with the tire of the vehicle wheel. The tension of the belt is thus constantly utilized to maintain the further frictional driving contact between the said driving wheel of the motor vehicle and the friction driving pulley 21 of the power transmission device, the bearing frame for the shaft of said pulley 21 being free to slide longitudinally upon the base A and being retained in place and directed in its sliding movements by the guiding members 25. The power transmission device is of a small size and may be readily transported in the vehicle in conjunction with which it is to be used.

I claim:—

1. In a power transmission device for motor vehicles, the combination of a base, means connected with said base for raising one of the driving wheels of said motor vehicle clear of the ground, a bearing frame slidable upon and supported by said base, and a rotary transmission shaft journaled on said bearing frame and having a friction pulley adapted to be driven by frictional contact with the driving wheel of the motor vehicle and also having a belt pulley fast thereon, said bearing frame being freely slidable in order that said friction pulley may adjust itself in relation to said driving wheel of the vehicle.

2. In a power transmission device for motor vehicles, the combination of a base, means connected with said base for raising one of the driving wheels of said motor vehicle clear of the ground, a bearing frame slidable upon and supported by said base, a rotary transmission shaft journaled on said bearing frame and having a friction pulley adapted to be driven by frictional contact with the driving wheel of the motor vehicle and also having a belt pulley fast thereon, said bearing frame being freely slidable in order that said friction pulley may adjust itself in relation to said driving wheel of the vehicle, the vehicle wheel raising means consisting of a fulcrum post rising from said base, an axle engaging lever supported by said fulcrum post, and means adapted to connect said lever with the base for holding said lever in its raising position.

3. In a power transmission device for motor vehicles, the combination of a base, means connected with said base for raising one of the driving wheels of said motor vehicle clear of the ground, a bearing frame slidable upon and supported by said base, a rotary transmission shaft journaled on said bearing frame and having a friction pulley adapted to be driven by frictional contact with the driving wheel of the motor vehicle and also having a belt pulley fast thereon, said bearing frame being freely slidable in order that said friction pulley may adjust itself in relation to said driving wheel of the vehicle, and guiding means on said base for said slidable bearing member said guiding means being reversible as and for the purpose specified.

4. In a power transmission device for motor vehicles, the combination of a base, means connected with said base for raising one of the driving wheels of said motor vehicle clear of the ground, a bearing frame slidable upon and supported by said base, a rotary transmission shaft journaled on said bearing frame and having a friction pulley adapted to be driven by frictional contact with the driving wheel of the motor vehicle and also having a belt pulley fast thereon, said bearing frame being freely slidable in order that said friction pulley may adjust inself in relation to said driving wheel of the vehicle, and guiding means on the base for said slidable bearing frame, said guiding means and said wheel elevating means being reversible as and for the purpose specified.

In testimony whereof I affix my signature.

JOHN E. WISTNER.

Copies of this patent may be obtained for five cents each, by addressing the "Commissioner of Patents, Washington, D. C."